C. H. MANKINS.
DETACHABLE SHOVEL TOOTH POINT.
APPLICATION FILED APR. 4, 1914.
1,174,331.
Patented Mar. 7, 1916.
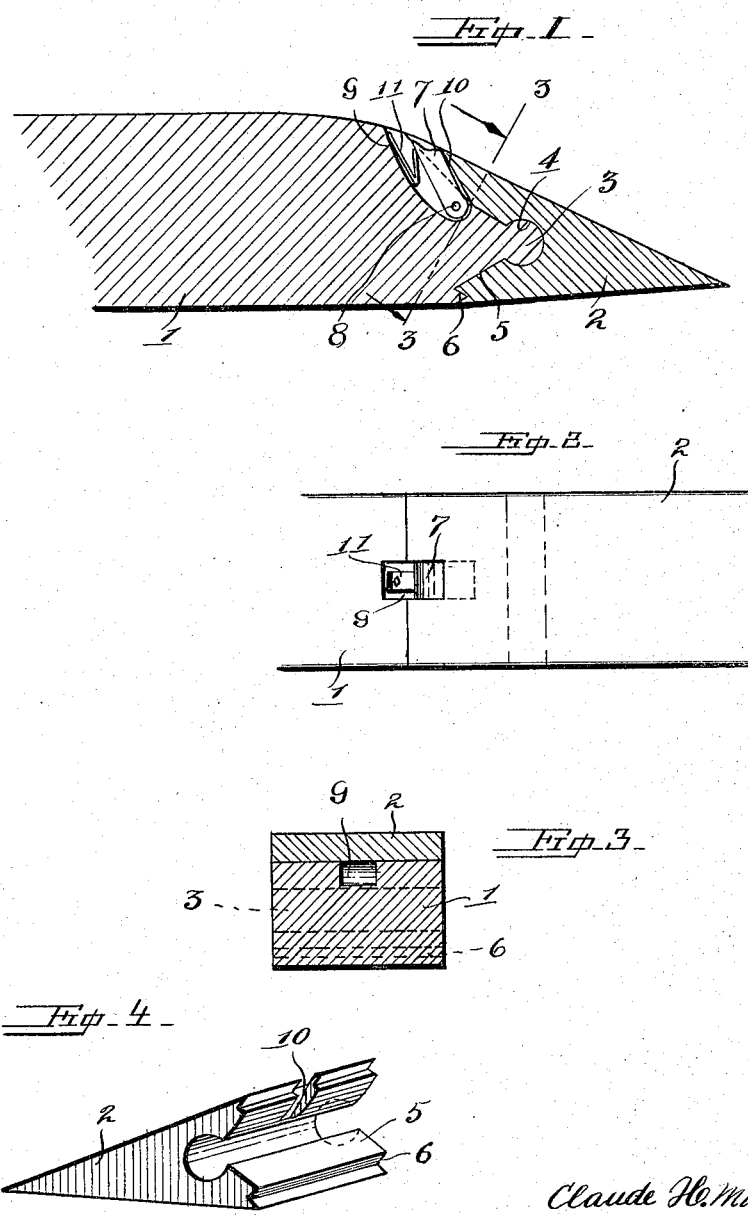
Witnesses
Edw. S. Hall.
W. E. Valt Jr.
Inventor
Claude H. Mankins.
By
his Attorney

UNITED STATES PATENT OFFICE.

CLAUDE H. MANKINS, OF BROWN STATION, NEW YORK.

DETACHABLE SHOVEL TOOTH-POINT.

1,174,331.  Specification of Letters Patent.  Patented Mar. 7, 1916.

Application filed April 4, 1914. Serial No. 829,629.

*To all whom it may concern:*

Be it known that I, CLAUDE H. MANKINS, citizen of the United States, residing at Brown Station, in the county of Ulster and State of New York, have invented certain new and useful Improvements in Detachable Shovel Tooth-Points, of which the following is a specification.

My invention relates to an improved design of shovel tooth point to be used on steam shovels, buckets, and other excavating apparatus.

It is the primary object of the present invention to so form the tooth point as to provide for its ready detachment, the point when in place, however, being so held as to withstand the usual stress and strain incident to its use.

The invention as a further object aims to provide an appropriate dove-tail joint between the point and the tooth, a retaining element being so arranged relatively to the joint as to prevent lateral play or movement of the point when in place.

The above and additional objects are accomplished by such means as are illustrated in their preferred embodiment, in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is a longitudinal sectional view of a portion of a tooth illustrating the manner in which the point is jointed thereto; Fig. 2 is a top plan view; Fig. 3 is a section on the line 3—3 of Fig. 1, and Fig. 4 is a detail perspective view of the point.

Referring now to the drawings by numerals, 1 designates as an entirety the tooth body, and 2, as an entirety the tooth point. A tenon 3 is integral with the body 1, the longitudinal axis thereof extending in a plane parallel to the line of tooth thrust. An appropriate mortise 4 is formed within the tooth point 2, the mortise receiving the tenon 3 to effect what might be termed a form of dove-tail joint. As is apparent upon reference to Fig. 1 of the drawings, the tenon 3 is enlarged at its free end, the walls thereof diverging as indicated at 5 to points adjacent the respective faces of the tooth where they terminate in ribs 6 extending in a plane parallel with the axis of the tenon. The enlarged portion of the mortise 4 are shaped to conform to the configuration of the tenon to effect, in the assembled relation of the tooth parts, a positive, non-yielding and efficient joint.

As a means whereby the tooth point is held against lateral movement or play, I provide a pawl or keeper 7 pivoted as at 8 within a recess 9 of the tooth body, preferably at a point equi-distant from the respective lateral faces of the tooth. A groove 10 is formed within the tooth point 2 and, in the assembled position of the point, is in registration with the recess 9 aforesaid. By disposing a suitable spring 11 beneath the keeper 7 and within the recess 9, it is apparent that pressure is at all times exerted upon the keeper to in this manner maintain the keeper within the groove 10 and, as the said groove is of a size only large enough to receive the keeper, lateral play or movement of the tooth point is impossible. Pressure upon the keeper 7 against tension of spring 11 will disengage the former and the tooth point 2, thus permitting, if desired, lateral movement of the point until detached.

From the foregoing, taken in connection with the accompanying drawings it will be noted that my improved tooth point is so constructed as to be fitted upon the end of the body of the tooth by means of a mortise and tenon preferably of the dove-tail type, so as to form a sort of dove-tail joint; that the longitudinal axis of the joint is approximately parallel to the line of thrust of the tooth so that in practice the joint between the body and point of the tooth will be subjected to no stresses whatever, except the end thrust of the apparatus when the shovel makes a working stroke; shearing and bending stresses being in this manner eliminated.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. A tooth of the character described including a body portion, a tenon integral with said body, the free end of the tenon being enlarged, the walls of the tenon diverging from the enlargement to points adjacent the respective faces of the tooth, ribs integral with the body, and a detachable point, said point having a mortise formed therein to receive the tenon and grooves to receive the ribs, as and for the purpose set forth.

2. A tooth of the character described including a body portion, a tenon integral with said body, the free end of the tenon being enlarged, the walls of the tenon diverging from said enlargement, to points adjacent the respective faces of the tooth, ribs integral with the body portion, a detachable point, said point having a mortise formed therein to receive said tenon, and grooves formed therein to receive said ribs, and a spring pressed pivoted pawl carried by said body and normally fitting a groove within said point to maintain the tenon within the mortise and the point against lateral movement independent of the body, as and for the purpose set forth.

In testimony whereof I affix my signature in presence of two witnesses.

CLAUDE H. MANKINS.

Witnesses:
C. K. HENRY,
GRANT BENEDICT.

Copies of this patent may be obtained for five cents each, by addressing the "Commissioner of Patents, Washington, D. C."